H. A. MALTZ.
DIRIGIBLE HEADLIGHT BRACKET.
APPLICATION FILED APR. 22, 1916.

1,229,304.

Patented June 12, 1917.
2 SHEETS—SHEET 1.

H. A. MALTZ.
DIRIGIBLE HEADLIGHT BRACKET.
APPLICATION FILED APR. 22, 1916.
1,229,304.
Patented June 12, 1917.
2 SHEETS—SHEET 2.
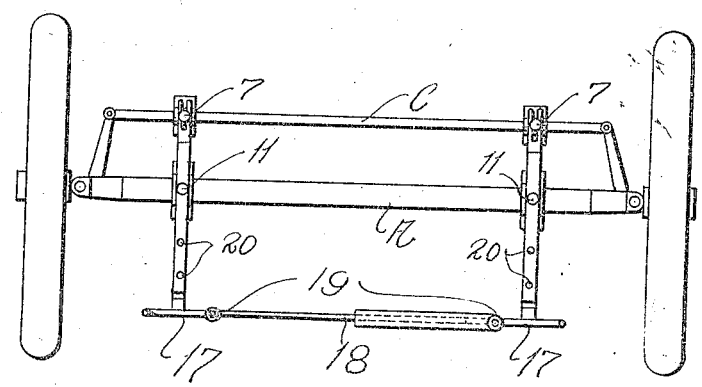
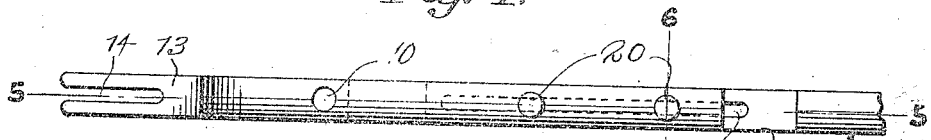
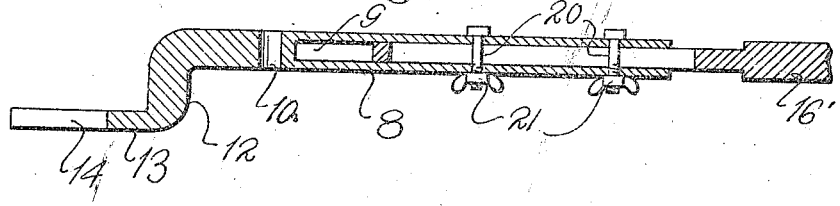
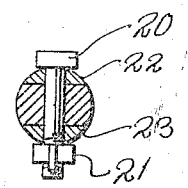

UNITED STATES PATENT OFFICE.

HARRY A. MALTZ, OF ITHACA, NEW YORK.

DIRIGIBLE-HEADLIGHT BRACKET.

1,229,304.   Specification of Letters Patent.   Patented June 12, 1917.

Application filed April 22, 1916. Serial No. 92,934.

*To all whom it may concern:*

Be it known that I, HARRY A. MALTZ, a citizen of the United States, residing at Ithaca, in the county of Tompkins and State of New York, have invented certain new and useful Improvements in Dirigible-Headlight Brackets, of which the following is a specification.

This invention relates to a dirigible head light bracket more particularly designed for use on such vehicles as automobiles and the like wherein it is desired to direct the rays of the light in the path of the vehicle as the latter is steered along such path.

One object of the present invention resides in providing a bracket of the above mentioned character in which each head light supporting arm is of an extensible nature and thus may be adjusted to suit the particular vehicle and to extend the lights forwardly thereof to such position as may be desired.

Another object of this invention resides in providing such a bracket as above mentioned which is simple in construction and easily attached to the vehicle without altering its usual appearance by drilling holes or the like.

With the above and other objects in view, I will now proceed to describe a specific embodiment of the invention which, as illustrating the principles thereof, I have shown in the accompanying drawings wherein:

Fig. 3 is a top plan view.

Fig. 4 is a detail elevation of one of the head light supporting arms showing its extensible nature.

Fig. 5 is a sectional side elevation on the line 5—5 of Fig. 4, and

Fig. 6 is a sectional view on the line 6—6 of Fig. 4.

Figure 1:
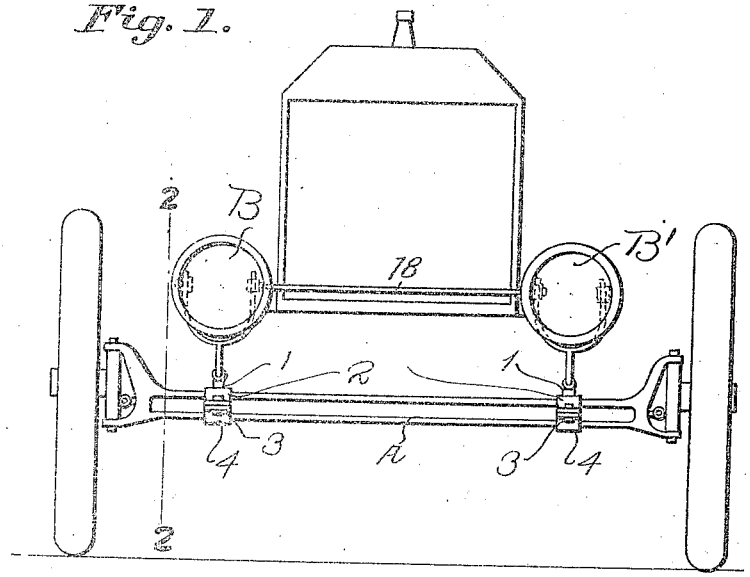
Figure 1 is a front elevation of a vehicle having the head light bracket of my invention adapted thereto.
Figure 2:
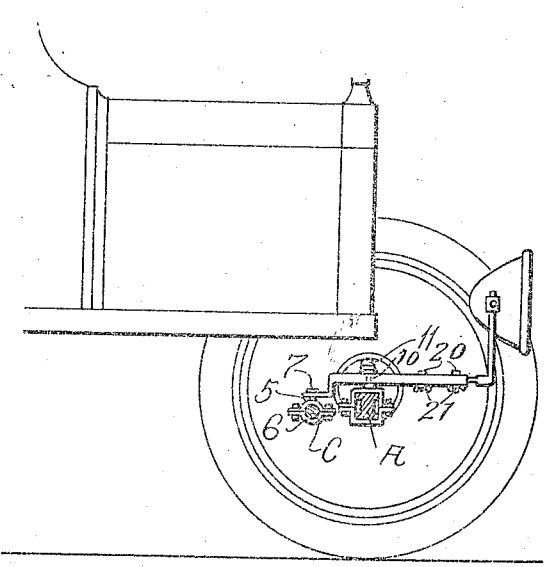
Fig. 2 is a sectional view on the line 2—2 of Fig. 1.

In detail:

The bracket, as herein shown, is attached to the axle A of an automobile for the purpose of directing the rays of the head lights B and B' in the path of the vehicle as the same is steered. Attached to the axle A at each side of the vehicle are pivots 1, which are carried by straps 2 overlying the top of the axle and bolted, as shown at 3, to similar straps 4 disposed beneath the axle and thus the pivots 1 are clamped in place. Immediately behind the axle A and moving parallel to the axle and in the same plane therewith as the vehicle is steered, is a steering rod C. When the wheels of the vehicle are in the position shown in Fig. 1, two clips are attached to the said steering rod C and each consists of the upper and lower straps 5 and 6, respectively, said upper straps carrying the headed pins 7.

The arms which carry the lamps B and B' each consist of the straight portion 8 recessed as shown at 9 and provided with the aperture 10 to fit over the pivots 1 and be secured against displacement thereof by the ends 11. The rear ends of the arms are bent downwardly as shown at 12 and rearwardly extended as shown at 13, said extensions 13 being provided with the slots 14 engaging the shanks of the pins 7. Fitting in the recess 9 is a shank 15 slotted as shown at 16 and the front end of said shank terminates in an enlargement 16', each carrying a forked bracket 17 adapted to carry one of the lights B or B'. The forked brackets are connected by a telescopic rod 18, the outer extremities of said rod being connected as at 19 to the respective brackets. This construction permits of the brackets being swung toward either side of the vehicle, but will prevent vertical vibrations of the brackets in a vertical direction relative to each other. The shanks 15, when the lights are adjusted, extend within the recesses 9 and are clamped in position by bolts 20 extending through the portions 8 of the arms and secured in place by wing-screws 21, thus, since said portions 8 are recessed, the recess extending from side to side thereof as shown in Fig. 6, the upper and lower portions 22 and 23 are clamped together upon the shank 15 as shown in Fig. 6 by the action of the wing nuts 21 and thereby serve to securely hold the parts of the bracket in assembled relation.

The operation of the device is as follows:—

When the vehicle is steered, the steering rod C moves relative to the axle depending entirely upon the direction in which the vehicle is steered. By reason of the fact that the pins 7 connect the head light arms with the said steering rod C and also by reason of the fact that the pivots 11 serve to reverse the movement of the forward ends of the arms relative to the rear ends, the head lights must move in the same relative direction as the wheels are turned by the steering gear of the automobile thereby, at all times, disposing the rays of light emanating from the head lights in the path of the vehicle.

While I have hereinbefore described a specific embodiment of the present invention, it is nevertheless to be understood that, in actual practice I may resort to such practical modifications as fall within the scope of the invention as defined in the appended claims.

I claim:

1. The combination with a vehicle having a steering mechanism, of a headlight bracket pivoted intermediate its ends to said vehicle, the said bracket comprising a pair of extensible arms, means for connecting one of said arms to a movable part of said steering mechanism, and means for supporting a lamp on the other of said arms.

2. The combination with a vehicle having the usual axle and steering rod, of a bracket pivoted upon said axle, said bracket comprising extensible arms, means for securing said arms in their various positions of adjustment, a lamp yoke carried by one of said arms, and means for connecting the other of said arms to said steering rod.

3. The combination with a vehicle having the usual axle and steering rod, of a bracket pivoted upon said axle, a pin projecting upwardly from said steering rod, one end of said bracket being forked and engaged with said pin, and means upon said bracket for supporting a lamp.

4. The combination with a vehicle having the usual axle and steering rod, a bracket adapted to be secured to said axle, an arm pivoted upon said bracket, means upon said arm for supporting a lamp and a connection between the other arm and said steering rod whereby movements of the latter may be transmitted to said arm.

5. The combination with a vehicle having the usual axle and steering rod, a bracket detachably secured to said axle, a pin on said bracket, an arm pivotally mounted upon said pin and extending at one end adjacent said steering rod, a bracket detachably secured to said steering rod and having an upwardly projecting pin, the adjacent end of said arm being forked and engaged with said pin, and means upon said arm for supporting a lamp.

6. In combination with a vehicle having the usual axle and steering rod, of a lamp bracket pivoted upon said axle, a connection between said bracket and steering rod whereby movements of the latter will oscillate the former, the said bracket comprising arms arranged in telescopic relation, the outer of said arms being provided with spaced apertures, the inner arm having an elongated slot, bolts adapted for insertion through said apertures and slots, and a yoke carried by the inner of said arms.

In testimony whereof I affix my signature in presence of two witnesses.

HARRY A. MALTZ.

Witnesses:
MORRIS ZAGER,
CHAS. BLOSTEIN.